US006880343B2

(12) United States Patent
Kopko

(10) Patent No.: US 6,880,343 B2
(45) Date of Patent: Apr. 19, 2005

(54) SUPERCHARGED GAS TURBINE WITH IMPROVED CONTROL

(76) Inventor: William L. Kopko, 8705 Cromwell Dr., Springfield, VA (US) 22151

( * ) Notice: Subject to any disclaimer, the term of this patent is extended or adjusted under 35 U.S.C. 154(b) by 200 days.

(21) Appl. No.: 10/309,002

(22) Filed: Dec. 4, 2002

(65) Prior Publication Data
US 2003/0106319 A1 Jun. 12, 2003

Related U.S. Application Data
(60) Provisional application No. 60/339,963, filed on Dec. 6, 2001.

(51) Int. Cl.$^7$ .............................. F02C 7/057; F02C 3/30
(52) U.S. Cl. .......................... 60/772; 60/775; 60/39.53; 60/726
(58) Field of Search ...................... 60/772, 775, 39.53, 60/726, 39.182

(56) References Cited

U.S. PATENT DOCUMENTS

| | | | | |
|---|---|---|---|---|
| 3,796,045 A | * | 3/1974 | Foster-Pegg | 60/772 |
| 4,667,465 A | * | 5/1987 | Munk | 60/39.53 |
| 4,702,074 A | * | 10/1987 | Munk | 60/39.53 |
| 4,731,990 A | * | 3/1988 | Munk | 60/775 |
| 5,353,585 A | * | 10/1994 | Munk | 60/39.53 |
| 5,622,044 A | * | 4/1997 | Bronicki et al. | 60/39.53 |
| 6,250,064 B1 | * | 6/2001 | Tomlinson et al. | 60/775 |
| 6,308,512 B1 | * | 10/2001 | Kopko | 60/773 |
| 6,442,942 B1 | * | 9/2002 | Kopko | 60/773 |
| 6,530,224 B1 | * | 3/2003 | Conchieri | 60/772 |
| 6,718,771 B1 | * | 4/2004 | Kopko | 60/773 |

OTHER PUBLICATIONS

Foster–Pegg R.W., "Supercharging of Gas Turbines by Forced Draft Fans with Evaporative Intercooling", American Society of Mechanical Engineers, Jan. 7, 1965, pp. 1–12.*

* cited by examiner

Primary Examiner—Ted Kim
(74) Attorney, Agent, or Firm—Novak Druce DeLuca & Quigg, LLP

(57) ABSTRACT

A gas-turbine supercharging system with improved control. A gas-turbine supercharger that preferably comprises a variable-pitch axial flow fan and a logger supplies, cooled, pressurized air to a gas-turbine power plant. The gas-power plant is preferably a part of combined-cycle power plant that comprises a steam cycle and a duct burner. A controller modulates the output of the fogger and the supercharging fan to maximize the total plant output and provide optimum efficiency without exceeding plant operating limits. The fogger and fan are preferably selected to maximize the allowable output from gas turbine at summer peaking conditions. For the case of a combined-cycle power plant, the preferred mode of operation is to reduce fog output while maintaining a maximum fan pressure as ambient temperature drops below the maximum design value. For a simple-cycle gas turbine, the preferred mode of operation is to reduce pressure output of the supercharging fan while adjusting fog output to match the maximum allowable moisture content at the gas-turbine inlet. The control also reduces fog output at low ambient temperatures to prevent possible ice formation.

9 Claims, 3 Drawing Sheets

SUPERCHARGED GAS TURBINE WITH IMPROVED CONTROL

Applicant claims benefit of co-pending provisional application No. 60/339,963 that was filed on Dec. 6, 2001, entitled "Supercharging System for Gas Turbines with Improved Control."

BACKGROUND—FIELD OF THE INVENTION

This invention is related to the field of controls for gas-turbine power plants, specifically a control system for a gas-turbine supercharger that includes a fogger and a supercharging fan.

BACKGROUND—DESCRIPTION OF THE PRIOR ART

This invention is an improvement on the gas-turbine supercharger described copending application PCT/US00/15821, which describes a gas-turbine supercharging system that uses a variable-pressure fan and a fogger to pressurize and cool inlet to a gas turbine. While this application describes the basic configuration of the supercharging system and describes the use of a variable pressure fan in control of the supercharger, it does not provide a complete description of optimum control over a full range of ambient conditions. In addition, further analysis of operation of supercharging system with combined-cycle power plants shows that system performance can occur at conditions which require a higher supercharging pressure and a larger amount of a fan power than is optimum with simple-cycle turbines. For a more complete description of the prior art regarding gas-turbine supercharging, see this copending application or related patents (U.S. Pat. Nos. 6,442,942 and 6,308,512).

SUMMARY

In accordance with the present invention a control system that integrates the output from a fogger and a supercharging fan to optimize power-plant performance.

DRAWING FIGURES

FIG. 1—MECHANICAL CONFIGURATION OF THE PREFERRED EMBODIMENT

Figure 1:
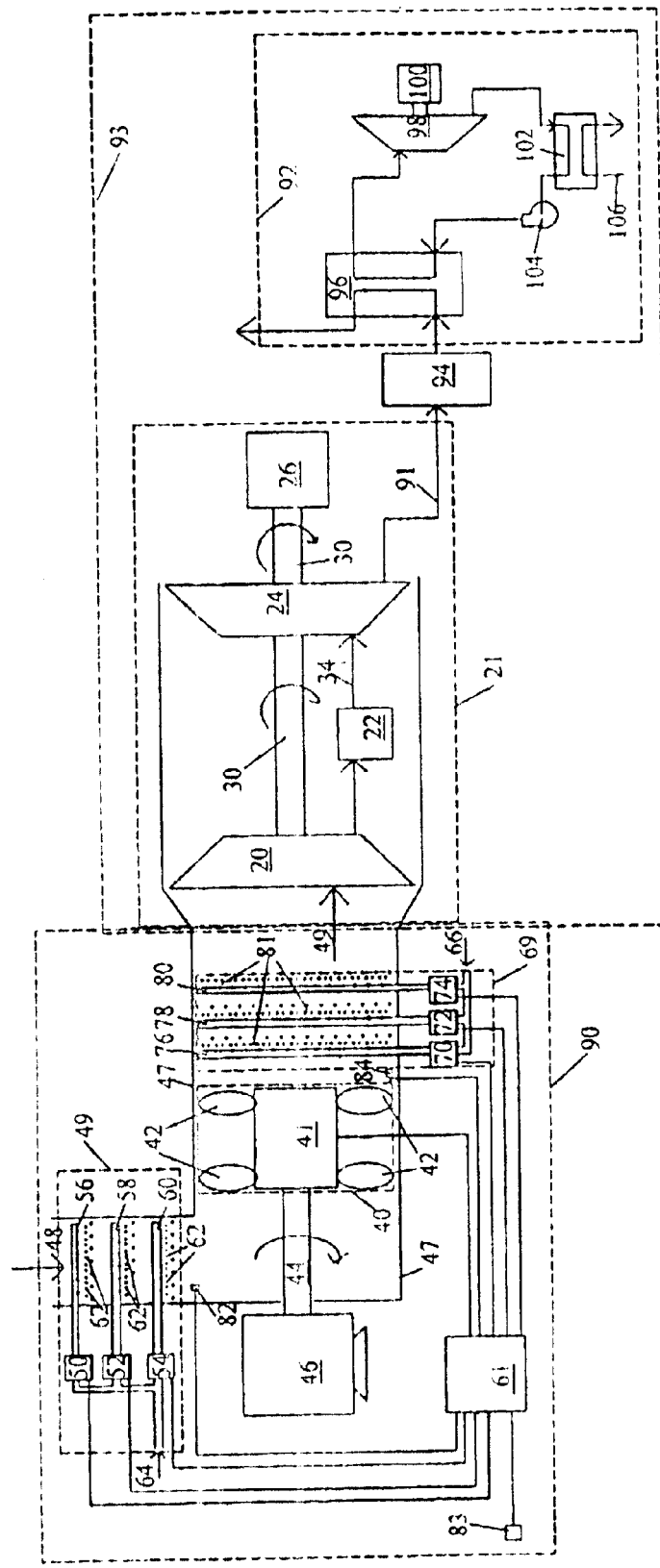
FIG. 1 shows a preferred mechanical embodiment of the supercharging system.

FIG. 1 shows a preferred embodiment of the invention. A gas-turbine power plant 21 comprises a compressor 20 and an expander 24 that are rigidly attached to a shaft 30 that drives a generator 26. An air stream 49 enters the compressor, which pressurizes the air and supplies it to a combustor 22. The combustor heats the air and supplies it to the expander 24. The expander extracts work from the expanding gas to drive the compressor and the generator.

The gas-turbine power plant is preferably a part of a combined-cycle power plant 93. In addition to the gas-turbine power plant, the combined-cycle power plant comprises a steam cycle 92 and a duct burner 94. The duct burner is optional and heats an exhaust stream 91 to a higher temperature before it enters a heat-recovery steam generator 96. The steam cycle comprises a fluid loop formed by the heat recovery steam generator 96, a steam turbine 98 that drives a steam-cycle electric generator 100, a condenser 102 and feed-water pump 104. Cooling water 106 is used to remove thermal energy from the condenser. While this figure shows a single pressure steam cycle, the steam cycle may include multiple steam pressures as is found in the prior art. The heat-recovery steam generator may supply steam for industrial processes or other applications instead of or in addition to a steam turbine for cogeneration applications.

For new installations, the steam cycle and associated duct burner are preferably sized to take advantage of the additional mass flow rate of exhaust provided by supercharging. This sizing would allow an increase in steam-cycle output that is proportional to the increase in mass flow, which greatly increases the total plant power output. For existing systems with duct burning, constraints on output of the steam cycle may limit the amount of thermal energy provided by the duct burner.

A supercharger 90 is located upstream of the gas-turbine power plant. The supercharger comprises a fan 40, a first fogger 49, and a second fogger 69 that are located inside a duct 47. The first fogger is located upstream of the fan, while the second fogger is located between the fan and the turbine.

The fan 40 comprises a hub 41 and fan blades 42. The fan is rigidly attached to a motor shaft 44. A motor 46 drives the motor shaft 44 and thereby drives the fan 40. The fan is preferably a variable-pitch axial flow fan. The hub 41 includes a mechanism for adjusting the pitch of the fan blades 42 to adjust fan output pressure and flow.

Typical operating speeds are normally between 900 and 1800 rpm, which is usually less about 25% to 50% of the compressor and expander. Fans of this kind are found in coal-fired power plants and other industrial applications. Vendors include Howden, TLT Babcock, and ABB.

The motor is preferably a three-phase induction motor or other electric motor. Another option is to drive the fan directly from the main turbine, normally through a mechanical speed reducer. This approach eliminates the need for the motor. A separate prime mover for the fan, such as a second gas turbine, a steam turbine, or an internal-combustion engine, is also an option, though not preferred. An important advantage of an electric motor is that it is relatively easy to install on an existing gas turbine.

The output of the supercharging fan is on the order of 60 to 90 inches of water static pressure. Multiple fans can be place in series to achieve higher pressures. The optimum pressure depends on the availability of a suitable fan, generator capacity, turbine capacity, and other factors.

A multistage, axial-flow fan, as shown in FIG. 1, can achieve this static pressure. Centrifugal fans or single-stage axial fans are also an option. If centrifugal fan is used, variable-pitch blades are not normally an option so a variable-speed drive is the preferred means for controlling fan capacity. Other options include variable inlet vanes or dampers, but they are less efficient. Variable-speed is also an alternative for axial fans.

The first fogger 49 comprises a first manifold 56, second manifold 58, and a third manifold 60. Each manifold has spray nozzles that create mist 62.

The mist preferably has small droplet sizes, typically in the range of 10 to 30 microns or less. The small droplet size allows the mist to be carried by the air steam and prevents mechanical damage to the compressor or other components. The fogger design is similar to that sold commercially in the prior art for gas-turbine applications. Example vendors include Vallorbs, Mee Fog, and Fern Engineering.

The first manifold receives pressurized water from a first pump 50. Likewise a second pump 52 and a third pump 54 supply pressurized water to the second and third manifolds 58 and 60 respectively. The pump outlet pressure is preferably roughly 1000 to 3000 psi. A stream of water 64 feeds the pump inlets. The water is preferably filtered, demineralized water. An air stream 48 is drawn into the duct 47 through the first fogger 49.

The second fogger 69 is located downstream of the fan. Like the first fogger, the second fogger is comprised of multiple manifolds and pumps. The fourth, fifth and sixth manifolds, 76, 78, and 80 are connected to fourth, fifth, and sixth pumps 70, 72, and 74 respectively. The action of pressurized water in the nozzles in the manifolds creates a mist 81.

There is a large degree of flexibility in the design of the foggers. For example the number of manifolds in each fogger is somewhat arbitrary. A larger number allows for easier control over the amount of fog produced and provides additional redundancy. On the other hand, fewer manifolds simplify installation and may reduce cost. In addition manifolds are not necessarily of equal capacity.

As far as the capacity of the foggers, the first fogger is preferably sized to ensure nearly saturated air on the outlet of the fan. The second fogger would further saturate the air and provide extra moisture for cooling inside the compressor 20. The total mass of water added to the air stream would preferably be the amount for saturation at the inlet to the compressor plus roughly 0 to 2% of the air mass flow rate.

A controller 61 controls the operation of the supercharger 90. The basic approach is to reduce fan pressure and the amount of fogging at lower ambient temperatures to prevent overload of the generator and other components in the gas-turbine power plant. An ambient air temperature sensor 83, a fan inlet temperature sensor 82, and a fan outlet temperature sensor 84 provide input to the controller. As the ambient wet-bulb temperature drops, the fan inlet temperature provides a signal to the controller to reduce fan capacity by providing an output signal to reduce the pitch of the fan blades or reduce the quantity of fogging. In addition, the lower temperatures mean that less water is required to saturate the air, so the controller 60 can turn off some of the pumps for the foggers.

As ambient temperature approach freezing, the pumps for the first fogger can be turned off to prevent ice formation. The second fogger may still operate at this condition, if the capacity of the generator and other components is adequate.

At very low temperatures when no supercharging is possible, the fan and the foggers may be turned off and the fan may be held in place with a brake. A bypass damper around the fan may be provided to reduce pressure drop to the turbine under these conditions.

There are numerous variations on this basic embodiment. For example the second fogger may be eliminated in cases where the turbine compressor is especially sensitive to the droplets of water. In this case the controller could modulate the amount of fog from the first fogger to ensure complete evaporation of the water droplet before they reach the turbine.

Another option, though not preferred would be to eliminate the first fogger. This change would cause only a relatively small penalty in performance if the capacity of the second fogger were increased to compensate.

Many options for the fan selection are possible. For example, multiple fans may be desirable for some applications. Multiple fans can provide redundancy to improve system reliability. They may also reduce cost through the use common parts and may allow for more sophisticated control options.

Fixed fan output is another simple control alternative. This approach is an option for cases where the generator is sized to handle the full output of the turbine at the normal operating conditions. This option is also possible in cases where another means of turbine capacity control, such as modulation of the combustor output or means for heating the inlet air stream, can prevent overload of the generator and other components.

As with conventional gas-turbine power plants, filters and silencers are normally provided with this system. The operation of the fan and the foggers is not normally affected by dust so the location of the filter is primarily a matter of convenience. Fog droplets do somewhat increase the pressure drop through filter, so the preferred location is normally upstream of the fogger. A silencer is preferably located upstream of the fan to prevent radiation of noise.

This system can supply a large capacity increase. For a conventional supercharger with a conventional evaporative pad with a 90% effectiveness and 60 inches of water supercharging, the capacity increase is between 20 and 30 percent. Fog intercooling can provide up to 10 percent additional capacity in additional capacity. In addition the fog can effectively provide 100% evaporative cooling effectiveness and reduces the theoretical fan power requirements by several percent. The result is a system that can readily achieve a capacity increase of 20 to 40% or more, depending on the climate and specific design limit of the gas-turbine power plant.

FIG. 2—CONTROL DIAGRAM FOR PREFERRED EMBODIMENT

Figure 2:
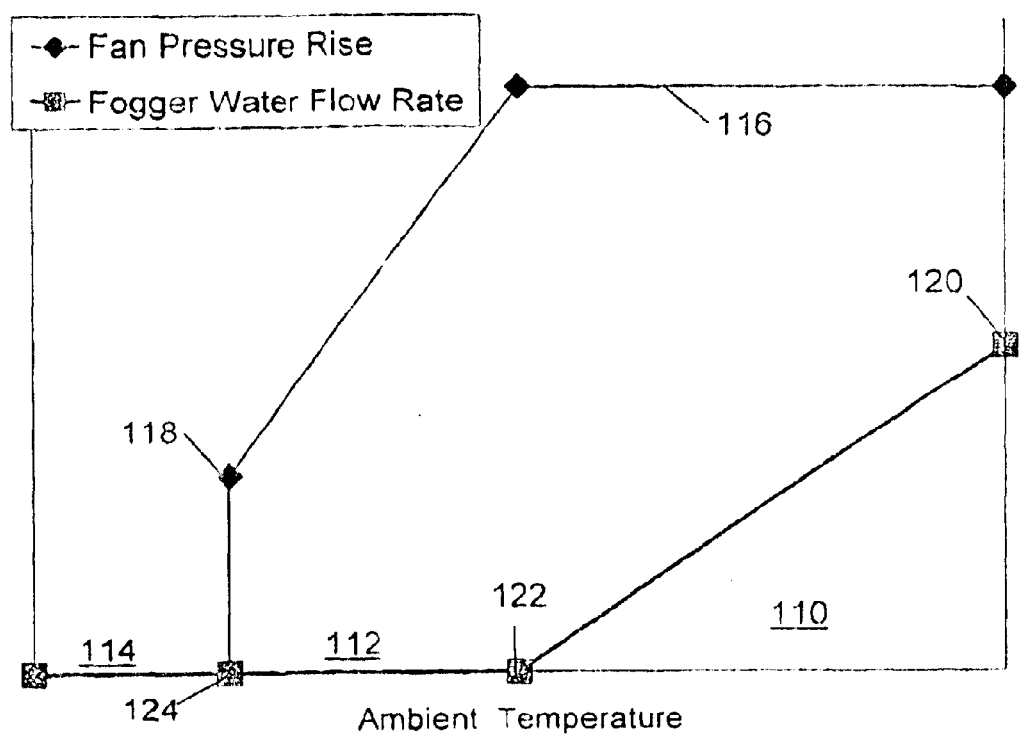
FIG. 2 is a diagram showing the different control modes a preferred embodiment of the invention that is suitable for use with a combined-cycle power plant.

FIG. 2 shows the operating modes for a preferred embodiment of the invention that is especially suitable for use with combined-cycle power plants. A combined-cycle power plant includes a steam cycle that is driven by thermal energy that is exhausted by a gas turbine. The control has three basic modes of operation. A first mode, 110, operates at higher ambient temperature. The quantity of water supplied through the foggers is modulated from a maximum flow condition, 120, at high ambient temperatures to a minimum flow condition, 122, at lower ambient to maintain approximately a constant temperature to the compressor inlet. The pressure rise from the supercharging fan is kept at a maximum design pressure 116.

At a high ambient temperature design condition, the fogger flow rate corresponds to a maximum moisture content for the gas turbine. This maximum moisture content can be an overspray condition or it can correspond to a condition that approaches saturation of the inlet air. This condition is set by the limitations of the gas turbine to prevent blade erosion, compressor stall, or other limitation.

The design fan pressure rise 116 is preferably selected to give a maximum allowable output from the gas turbine at summer peaking conditions. For existing plants this limiting output is frequently set by the generator for the gas turbine. Other constraints can be a shaft torque limit, transmission limit, government licensing limits, or other limitations on turbine output.

These output limits may be independent of ambient temperature, or they can vary with ambient temperature. For example, the capacity of air-cooled generators normally increase with lower ambient temperatures, while mechanical limits are usually independent of ambient conditions.

As the ambient temperature goes down, the output of the gas turbine would normally go up. To prevent overload of the generator for the gas turbine, the fogger water flow is reduced. This reduced fogging allows the maximum output of the combustion turbine to stay within the operating limits. For the case where there is a fixed output limit, the logger output is adjusted to maintain a constant inlet temperature to the turbine compressor. The minimum ambient temperature for this mode of operation corresponds to zero fogger output.

This first mode of operation maximizes output from a combined-cycle power plant. The efficiency and capacity of the power plant are maintained at fixed high level because the inlet conditions to the gas turbine are fixed.

At lower ambient temperatures below that corresponding to the minimum flow condition 122, a second mode 112 operates. This mode of operation adjusts fan pressure rise from the maximum value 116 to a minimum fan pressure rise 118 with no fogger operation. This operation can maintain a constant output from the combustion turbine. Efficiency and steam-cycle output may decline somewhat in this mode of operation.

At ambient temperatures below a minimum operating temperature, 124, the system enters a third mode 114. Both the fan and the foggers do not operate in this mode, since gas turbine output is near is maximum value.

FIG. 3—ALTERNATE EMBODIMENT

Figure 3:
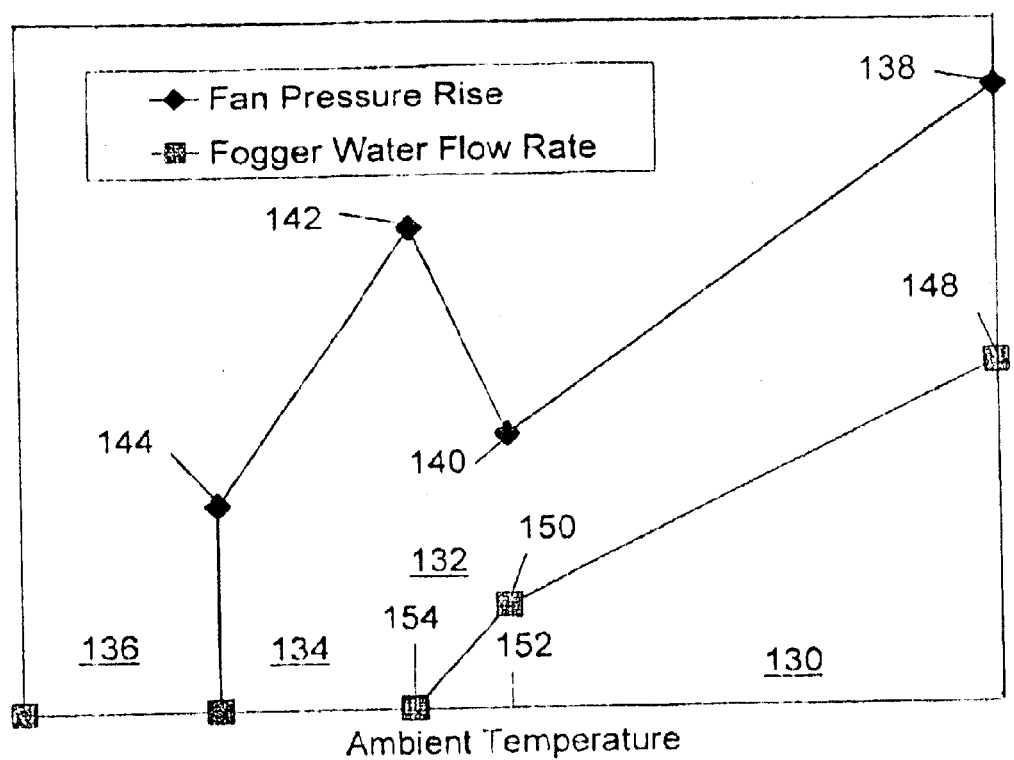
FIG. 3 is a diagram of the control modes for an alternate embodiment.

FIG. 3 shows an alternate embodiment that is preferably applied to simple-cycle plants. A first mode of operation 130 corresponds to higher ambient temperatures. For simple-cycle plants, the output is generally maximized through maximizing the allowable fogging.

The pressure output of the supercharging fan is adjusted downward from a design pressure rise 138 to maintain the maximum plant output at lower ambient temperatures. Likewise the fogger output is reduced from a design fogger flow 148 to maintain a maximum allowable moisture content, which normally corresponds to maintaining a constant difference between dry-bulb and wet-bulb temperature entering the gas turbine. In cases with overspray of fog, the preferred control is to maintain an approximately constant liquid fraction of water into the turbine.

At a first ambient temperature 152, the corresponding gas-turbine inlet air temperature reaches a minimum acceptable value. This value is related to potential ice conditions and corresponds to an inlet wet-bulb temperature between about 32 and 50 F and with a typical value of about 40 to 45 F. The temperature drop associated with acceleration of air at the turbine inlet has the potential for producing icing conditions at lower temperatures.

There are three control options below this temperature. A first option is to simply turn the floggers off and continue to operate the supercharging fan. Operating mode 134 show this option. A second option is to modulate combine lower fogger output and higher supercharging fan pressure rise to maintain a constant wet-bulb temperature condition to the turbine inlet as ambient temperature drops. Operating mode 132 follow this control method. A third option is simply to turn off the supercharging fan and the foggers. Operating mode 136 is this option.

The preferred sequence shown in FIG. 3 maximizes power output. Mode 132 operates ambient temperatures between a first ambient temperature 152 and a second ambient temperature 154 that correspond to the limits of mode 134 and mode 130. At the second ambient temperature 154, the fogger reaches zero output and the fan reaches a maximum pressure rise 142. Maximum pressure rise 142 is preferably close the design pressure rise 138.

In mode 134, the fan pressure rise drops quickly to compensate for lower ambient temperatures. At a minimum pressure rise 144, fan power is close to the corresponding power increase from the pressure rise. At this point operation of the supercharging fan provide little advantage and it is turned off.

Other Embodiments

Numerous combinations and variations are possible using these basic operating modes. For example, it is possible to vary the mode of operation depending on market prices of electricity and fuel. At low electric prices relative to fuel, it may be desirable to operate in reduced fogging especially in systems with duct burner operating with a fixed steam requirement, as for cogeneration applications. The controller preferably includes an optimization routine for determining the optimum mode of operation based on electric prices, fuel prices, power-plant operating constraints, and other factors.

Operation with a fixed-capacity supercharging fan is also possible. In this case, the fogger output modulates output at higher ambient temperatures. At lower ambient temperatures, the gas turbine's burner controls or other capacity control modulate gas turbine output to prevent overload. At very low ambient temperatures or in cases where electric prices to not support additional output, the supercharging fan can be turned off.

Yet another option is to operate at fogging output and pressure output that is between the two extremes of maximum fogging and maximum pressure. For example, fan efficiency is typically higher at above about 50% of design pressure rise. For conditions that below this range it may be desirable to back off on fogging to maintain a higher pressure and thus a higher fan efficiency. The optimum control for this configuration depends on the details of the fan performance and performance of the gas-turbine power plant. Ideally the control would use these performance characteristics to determine the optimum combination of fogging a supercharging pressure.

What is claimed is:

1. A method for operating a supercharged gas turbine power plant that comprises a fogging system and a supercharging fan that cools and pressurizes an air stream entering a gas turbine inlet, to achieve a desired predetermined power output from said power plant, said method comprising the steps of:

adjusting supercharging pressure of said supercharging fan while maintaining a constant quantity of fog; and adjusting flow rate of said fogging system to vary the quantity of fogging of said air stream only when said supercharging pressure of said supercharging fan is at a maximum desired value.

2. The method of claim 1, wherein said constant quantity is substantially zero.

3. A method for operating a supercharged gas turbine power plant having a fogger for supplying a quantity of fog to a gas-turbine inlet air stream and a supercharging fan for pressurizing said gas-turbine inlet air stream to maintain a desired power-output from said gas-turbine power plant, comprising the steps of:

a. in a first mode for ambient temperatures above a predefined ambient temperature condition, maintaining a maximum desired supercharging pressure of said fan while varying the quantity of fog to maintain a gas-turbine inlet temperature that corresponds to a maximum desired power-output capability from said gas turbine power plant; and b. in a second mode for ambient temperatures below said ambient temperature condition, adjusting the supercharging pressure while maintaining a constant quantity of fog, to maintain said maximum desired power output capability from said gas turbine power plant.

4. The method of claim 3 wherein said ambient temperature condition corresponds to that which provides said maximum desired power output capability from said gas turbine power plant without fogging, such that said constant quantity is substantially zero.

5. The method of claim 4 wherein the quantity of fog supplied in said first mode maintains an approximately constant gas-turbine inlet air temperature for a range of ambient temperatures.

6. A method for operating a supercharged gas turbine power plant that comprises a fogging system and a supercharging fan that cools and pressurizes an air stream entering a gas turbine inlet, to achieve a desired predetermined power output from said power plant, said method comprising the steps of:

adjusting supercharging pressure of said supercharging fan while maintaining a maximum desired quantity of fog; and adjusting flow rate of said fogging system to vary the quantity of fogging of said air stream only when said supercharging pressure of said supercharging fan is maintained at a constant value.

7. The method of claim 6, wherein said constant value is substantially zero.

8. A method for operating a supercharged gas turbine power plant having a fogger for supplying a quantity of fog to a gas-turbine inlet air stream and a supercharging fan for pressurizing said gas-turbine inlet air stream to maintain a desired power-output from said gas-turbine power plant, comprising the steps of:

a. in a first mode for ambient temperatures above a predefined ambient temperature condition, varying supercharging pressure of said fan to maintain a maximum desired power output capability from said gas turbine power plant while varying the quantity of fog to maintain a substantially constant difference between dry-bulb temperature and wet-bulb temperature at an air inlet of said gas-turbine; and b. in a second mode for ambient temperatures below said ambient temperature condition, adjusting the supercharging pressure while maintaining a constant quantity of fog, to maintain said maximum desired power output capability from said gas turbine power plant.

9. The method of claim 8 further comprising a third operating mode for temperatures above said first ambient temperature condition and below a second ambient temperature condition that comprises modulating the quantity of fog and supercharging pressure to maintain a minimum wet-bulb temperature to the inlet of said gas turbine while maintaining said desired power-output capability of said gas turbine.

* * * * *